United States Patent [19]

Ranze et al.

[11] Patent Number: 5,248,358
[45] Date of Patent: Sep. 28, 1993

[54] METHOD AND APPARATUS FOR AUTOMATING SUPERCONDUCTING TAPE SPLICES

[75] Inventors: Richard A. Ranze; Donald B. Sorensen, both of Scotia; James T. Kundlack, Glenmont, all of N.Y.

[73] Assignee: General Electric Company, Schenectady, N.Y.

[21] Appl. No.: 705,214

[22] Filed: May 24, 1991

[51] Int. Cl.⁵ .............................................. B65H 69/02
[52] U.S. Cl. ..................................... 156/157; 156/249; 156/502; 29/599; 29/872; 505/925; 505/927
[58] Field of Search .................. 156/502, 157, 249; 29/599, 868, 872; 505/925, 927

[56] References Cited

U.S. PATENT DOCUMENTS

| | | | |
|---|---|---|---|
| 4,300,976 | 11/1981 | Wehr | 156/502 |
| 4,319,938 | 3/1982 | Vives | 156/344 X |
| 4,795,520 | 1/1989 | Klabins et al. | 156/502 X |
| 4,875,286 | 10/1989 | Leandris et al. | 29/872 |
| 5,082,164 | 1/1992 | Rumaner et al. | 29/872 X |
| 5,104,030 | 4/1992 | Ranze | 505/927 X |
| 5,109,593 | 5/1992 | Benz et al. | 29/599 |
| 5,134,040 | 7/1992 | Benz et al. | 505/927 X |

*Primary Examiner*—David A. Simmons
*Assistant Examiner*—Mark A. Osele
*Attorney, Agent, or Firm*—James R. McDaniel; Paul R. Webb, II

[57] ABSTRACT

A method and apparatus for automating superconducting tape splices is disclosed. In particular, a TIG welding torch is automatically traversed in front of two superconducting foils which are held in an overlapping relationship so that a weldment is created between the two foils and a splice is eventually created. The torch is automatically traversed by use of a stepper motor and a motor control which controls the direction of traverse and the traverse speed.

7 Claims, 3 Drawing Sheets

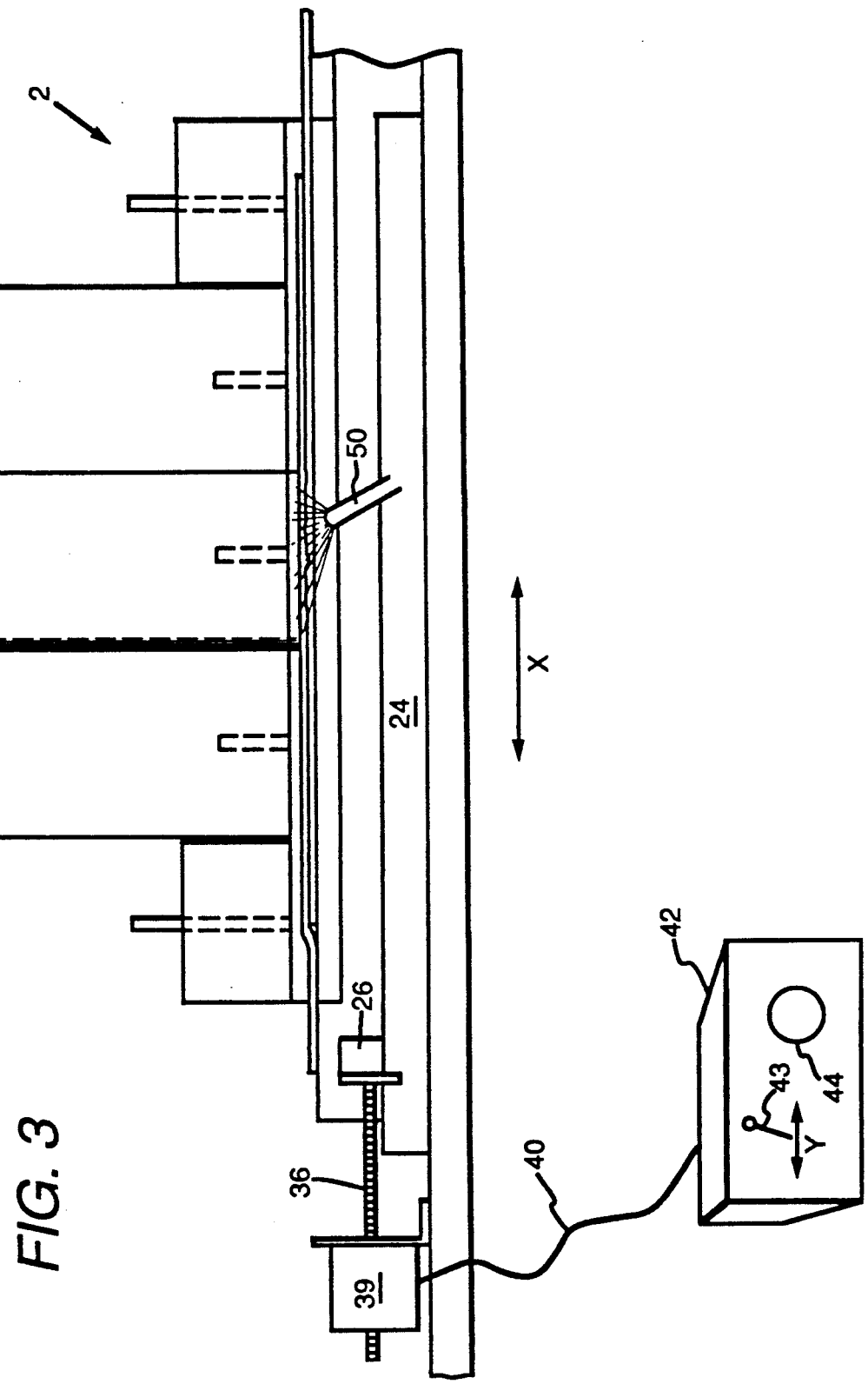

METHOD AND APPARATUS FOR AUTOMATING SUPERCONDUCTING TAPE SPLICES

BACKGROUND OF THE INVENTION

1. Field of the Invention

This invention relates to superconducting tape splicing methods and apparatus which automatically create a splice between two separate superconducting tapes. Such structures of this type generally allow a uniform splice to be created and the splice can be repeatedly formed.

2. Description of the Related Art

It is known in prior superconducting tape splice forming methods and apparatus to make use of a hand held torch to join the superconducting foils of superconducting tapes to each other. Typically, these foils are approximately 0.003" thick. This procedure was very dependent on operator skill in that the operator has to control the variations in current in the torch due to hand motion during welding. Also, no two operators have the same abilities to produce a repeatable weld and to achieve the precision positioning required for uniform weld. Consequently, a more advantageous system, then, would be presented if such amounts of dependence upon operator skill were reduced or eliminated.

It is apparent from the above that there exists a need in the art for a superconducting tape splicing system which is capable of splicing together superconducting tapes, and which at least produces splices equal in quality to the known manually created splices, but which at the same time substantially reduces or eliminates the problems associated with the manual procedure especially with respect to splice repeatability and uniformity. It is a purpose of this invention to fulfill this and other needs in the art in a manner more apparent to the skilled artisan once given the following disclosure.

SUMMARY OF THE INVENTION

Generally speaking, this invention fulfills these needs by providing an automatic superconducting tape splicing system for splicing at least two separate superconducting tapes, comprising delamination means; a holding means for holding said tapes in an overlapping relationship over a predetermined length; a heating means for creating a splice between said tapes over said predetermined length, and a drive means rigidly attached to said heating means for traversing said heating means along said predetermined length.

In certain preferred embodiments, the holding means includes chill blocks, weld fixtures, a hold down grounding block, conductor hold down blocks, and a base. Also, the heating means is a tungsten inert gas, hereinafter referred to as a TIG welding torch. Finally, the drive means is a digital linear actuator, a holding bar and a stepper motor IC driver.

In another further preferred embodiment, the splice between the abutting superconducting tapes can be created more uniformly and with greater repeatability.

The preferred splicing system, according to this invention, offers the following advantages: good stability; good durability; excellent repeatability; improved uniformity of the splice; good economy; and high strength for safety. In fact, in many of the preferred embodiments, these factors of repeatability and uniformity are optimized to an extent considerably higher than heretofore achieved in prior, known superconducting tape splicing systems.

BRIEF DESCRIPTION OF THE DRAWINGS

The above and other features of the present invention which will become more apparent as the description proceeds are best understood by considering the following detailed description in conjunction with the accompanying drawings wherein like characters represent like parts throughout the several views and in which;

FIG. 3 is a schematic drawing of the weld torch support drive, according to the present invention.

DETAILED DESCRIPTION OF THE INVENTION

Figure 1:
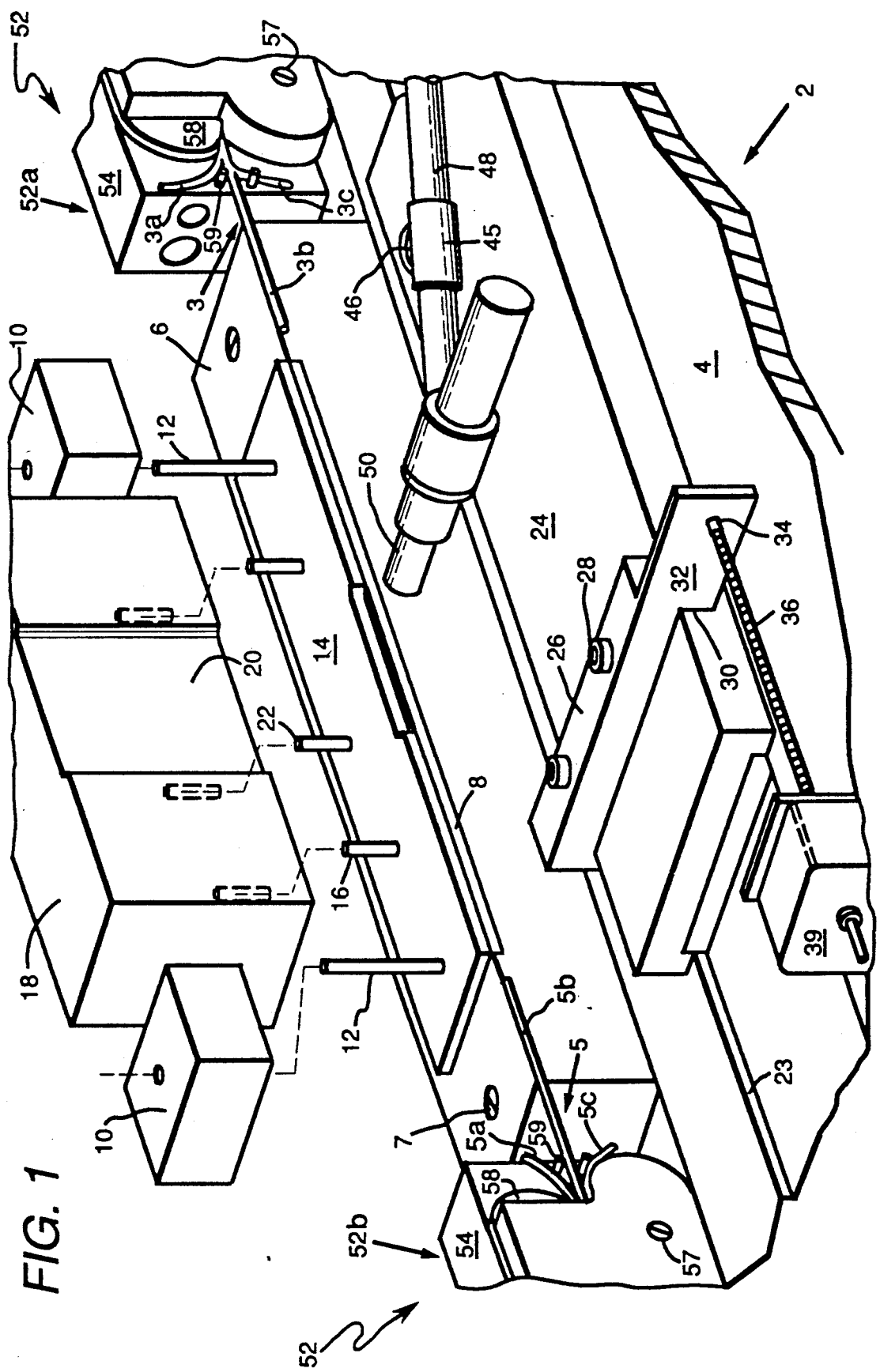
FIG. 1 is an exploded view of the component parts of an automatic superconducting tape splicing system, according to the present invention.
Figure 2:
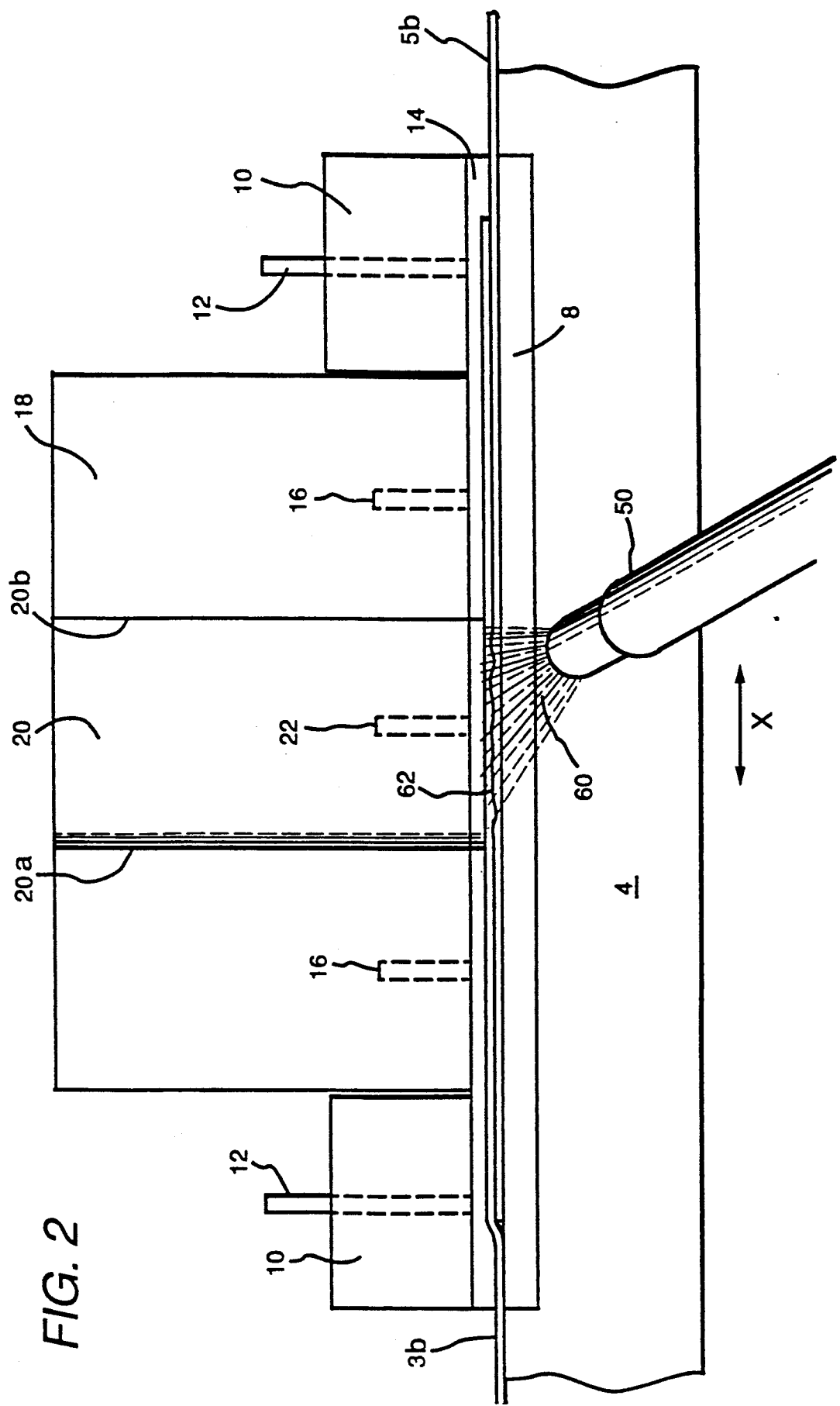
FIG. 2 is a close-up drawing of the splicing system which depicts two superconducting tapes being spliced together.

With reference first to FIG. 1, superconducting tape splicer 2 is illustrated. In particular, splicer 2 includes base 4 which, preferably, is constructed of aluminum. Located on top of base 4 is weld fixture base 6, which, preferably, is constructed of aluminum. Fixture base 6 is rigidly attached to base 4 by conventional fasteners 7. Lower chill block 8 which is, preferably, constructed of copper is located on fixture base 6 such that the upper surface of block 8 is substantially flush with the upper surface of fixture base 6. Conductor hold down blocks 10 are placed on both sides of chill block 8. Blocks 10, preferably, are constructed of steel and are retained in place by alignment pins 12. Pins 12, preferably, are constructed of rolled steel. Located on top of lower chill block 8 is upper chill block 14. Chill block 14 is, preferably, constructed of copper and is held in place by alignment pins 16. Pins 16 are, preferably, constructed of rolled steel. Hold down grounding block 18 is placed on top of upper chill block 14. Grounding block 18 is, preferably, constructed of brass and is retained in place by alignment pins 16 and 22. Pins 22, preferably, are constructed of rolled steel. Grounding block 18 also contains weld guide 20. Guide 20 is, preferably, milled into block 18 such that guide 20 is approximately 780 mils long along the X-direction (FIG. 2). Guide 20 serves to identify the amount of conventional superconducting tape 3,5 which will be spliced.

Located on base 4 is slot 23. Slot 23 is, preferably, milled into base 4 such that slide rail 24 is capable of being accurately positioned on base 4. Slide rail 24 is a conventional slide rail manufactured by Del Tron. In particular, slide rail 24 is an S3-6 model. Slide rail 24 is rigidly fastened to base 4 by conventional fasteners (not shown). Holding bar 26 is placed on top of rail 24. Bar 26, is, preferably, constructed of aluminum and is rigidly retained on top of rail 24 by conventional fasteners 28. Located along both ends of bar 26 are steps 30 with only one step 30 being shown in FIG. 1. Steps 30 are formed in bar 26 by conventional metal cutting techniques such as milling and are used to accurately align bar 26 with respect to rail 24. Extension 32 is located along one end of bar 26. Extension 32 is rigidly attached to drive rod 36 by a conventional fastener 34.

With respect to FIGS. 1-3, drive motor 39 is rotatably attached to drive rod 36. In particular, motor 39 and rod 36 make up a conventional digital linear actuator model number K92211-P2, manufactured by the Airpax Corporation Conventional electrical leads 40 are electrically connected to motor 39 and motor control 42 (FIG. 3). Motor control 42 includes a SAA1027 stepper motor IC driver which is also manufactured by the Airpax Corporation. Located on control 42 are direction switch 43 and speed control knob 44 (FIG. 3). Switch 43 is a conventional toggle switch and moving switch 43 to the left or to the right along arrow Y will cause slide rail 24 to likewise move to the left or to the right. Knob 44 is a conventional electrical knob and turning the knob either clockwise or counterclockwise will increase or decrease, respectively, the speed at which rail 24 traverses along direction X.

With respect to FIG. 1, drive motor 39 is used to position torch nozzle 50. Nozzle 50 is a conventional TIG nozzle having an electrode (not shown) which is, typically, 20 mils in diameter and uses a current which does not exceed 10 amps during operation. Torch 50 is retained on slide rail 24 by weld torch collar 45. Collar 45 is, preferably, constructed of copper and is retained on rail 24 by a conventional fastener 46. Located on the end of torch 50 is a conventional weld torch supply 48.

Located on both sides of base 4 are superconducting tape delaminators 52. Basically, delaminator 52 is used to delaminate tapes 3,5 so that they can be separated into their components $3a$, $3b$, $3c$ and $5a$, $5b$, $5c$. Components $3a$, $3c$, $5a$, $5c$ are the superconducting coverings while $3b$ and $5b$ are the superconducting foils. In the preferred embodiment, it is desired to only weld foils $3b$ and $5b$ together. In particular, delaminators 52 include delamination block 54, delamination hold down block 58 and pins 59. Blocks 54,58 are, preferably, constructed of aluminum while pins 59 are constructed of any suitable plastic material and have a diameter of approximately 1/16". Delaminators $52a$ and $52b$ are rigidly attached to a conventional support block (not shown) by fasteners 57. Delamination hold down block 58 is placed within the space located in block 54 in order to keep tapes 3,5 within delaminators 52. Pins 59 are used to separate, for example, components $3a,3b,3c$ from each other while tape 3 is being delaminated so that coverings $3a,3c$ do not interfere with the welding of foils $3b$ and $5b$.

In operation, when it is desired to form a splice between two separate superconducting tapes 3,5, tapes 3,5 are, initially, cut to remove any damaged sections to tapes 3,5. Tapes 3,5 are then placed, separately, into each delamination device 52 such that, preferably, tape 3 is placed in the delamination device $52a$ and tape 5 is placed in the delamination device $52b$ (FIG. 1). While in delamination device $52a$, for example, tape 3 rests on delamination block 54 and delamination hold down 58 is placed on top. In order to delaminate tape 3 into components $3a$, $3b$, $3c$, tape 3 is placed in the gap in block 54 such that tape 3 rests on face plate 56. Hold down block 58 is placed on top and delaminator 52 is heated up by conventional heaters (not shown) in delaminator approximately 200° C. At this point, delaminator 52 is turned off and tape 3 begins to delaminate into components $3a$, $3b$, $3c$. As components $3a$, $3b$, $3c$ separate, components $3a$, $3c$ are placed over pins 59 and foil $3b$ is pulled towards chill blocks 8,14 such that components $3a,3c$ curl up along pins 59 and away from foil $3b$. It is to be understood that tape 5 is delaminated into its respective components $5a$, $5b$, $5c$ in substantially the same manner. After tapes 3,5 are delaminated into respective components $3a,3b,3c$ and $5a,5b,5c$, components $3a,3c$ and $5a,5c$ are cut by conventional cutting techniques such that foils $3b$ and $5b$ extend, respectively, beyond components $3a,3c$ and $5a,5c$ with components $3a,3c$, $5a$ and $5c$ resting on pins 59. It is to be understood that components $3a,3c$ and $5a,5c$ are cut to a predetermined length so that when foils $5a,5b$ are welded together, components $3a,5a$ and $3c,5c$ should be able to be overlapped in order to complete the splice.

After components $3a,3b,3c$ and $5a,5b,5c$ are cut, foils $3b,5b$ are placed on lower chill block 8 so that foils $3b,5b$ overlap at least for a length which is equal to the length of weld guide 20. When foils $3b,5b$ are placed on lower chill block 8, conductor hold down blocks 10 are placed over foils $3b,5b$ and aligned by pins 12 to keep foils $3b,5b$ in place and, ultimately, in the desired overlapping relationship. After blocks 10 are in place, upper chill block 14, is placed over the overlapping foils $3b,5b$ and aligned by pins 16 and 22. Next, hold down grounding block 18 is placed on top of upper chill block 14 to assist in keeping foils $3b,5b$ in their overlapping relationship. It is to be understood that foils $3b,5b$ are located along chill blocks 8,14 and grounding block 18 such that their overlapping length extends out beyond blocks 8,14,18 towards torch nozzle 50 so that weldment 62 (FIG. 2) can be completed.

Once grounding block 18 is placed on upper chill block 14, grounding block 18 is electrically attached by conventional grounding wires (not shown) to a conventional ground source (not shown). Also, direction switch 43 is activated so that motor control 42 positions torch nozzle 50 approximately directly in front of the overlapping area of foils $3b,5c$ and weld guide $20b$ (FIG. 2). At this point, a conventional welding shield (not shown) is placed over torch nozzle 50 and torch nozzle 50 is activated so that TIG gas flows along supply 48, a spark is created at nozzle 50 and torch beam 60 is created.

When torch beam 60 (FIG. 2) is created, switch 43 is activated which causes torch beam 60 to traverse along overlapped foils $3b,5b$ in the direction X towards weld guide $20a$. Torch beam 60, preferably, should traverse along direction X for approximately 5 seconds until torch beam 60 reaches weld guide $20a$. At this point, the spark in torch nozzle 50 is cut off so that only gas is now flowing through nozzle 50. Switch 43 (FIG. 3) is then moved along direction Y so that nozzle 50 moves along direction X toward weld guide $20b$. During this part of the cycle, the flowing gas cools weldment 62 (FIG. 2). After approximately 5 seconds, nozzle 50 is, again, located in front of weld guide $20b$. When nozzle 50 reaches weld guide $20b$, the spark in nozzle 50 is reinitiated, torch beam 60 is re-established and nozzle 50 again begins to move along direction X towards weld guide $20a$. The above procedure is, preferably, done for three cycles so that weldment 62 is created along the area where foils $3b,5b$ overlap. It is to be understood in the preferred operation, that at the end of the third cycle, the spark in nozzle 50 is not re-initiated.

After weldment 62 is completed, tapes 3,5 are removed and superconducting covers $3a,5a$ and $3c,5c$, respectively, are spliced together by conventional splicing techniques to complete the splice between tapes 3,5.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. An automatic superconducting tape splicing system for splicing at least two separate superconducting tapes which is comprised of:
   a delamination means;
   a holding means for holding said tapes in an overlapping relationship over a predetermined length wherein said holding means is further comprised of: at least two chill block means located adjacent to each other; at least two conductor hold down block means located on both ends of said chill block means; a hold down grounding block means attached to a grounding source and located adjacent said chill block means and said hold down block means; alignment means for aligning said chill block means, said hold down block means and said grounding block means; and a base means;
   a heating means for creating a splice between said tapes over said predetermined length; and
   a drive means rigidly attached to said heating means for traversing said heating means along said predetermined length.

2. The splicing system, according to claim 1, wherein said heating means is further comprised of:
   a TIG torch nozzle means;
   a collar means for holding said nozzle means; and
   a TIG torch supply means.

3. The splicing system, according to claim 1, wherein said drive means is further comprised of:
   a base means rigidly attached to said heating means;
   a holding means having an extension rigidly attached to said base means;
   a bracket means located at a spaced distance away from said holding means;
   a motor means rigidly attached to holding means and said bracket means; and
   a motor control means electrically connected to said motor means.

4. The splicing systems, according to claim 3, wherein said motor control means is further comprised of:
   a speed control means; and
   a direction control means.

5. A method for automatically splicing superconducting tapes having at least two separate superconducting tapes, using an apparatus comprising a delamination means, a holding means, a heating means, and a drive means, wherein said method is comprised of the steps of:
   placing said tapes in said delamination means;
   delaminating said tapes wherein said step of delaminating said tapes is further comprised of the step of: delaminating said tapes into components of said tapes such that a foil section in said tape is separated from a covering of said tape;
   placing said delaminated tapes in said holding means wherein said placing said delaminated tapes in said holding means is further comprised of the steps of: placing said delaminated tapes on a base means having a first chill block means such that said foil sections of said tapes overlap each other for a predetermined distance along said first chill block means; placing a first and second conductor hold down block means on said foils to keep said foils in place; placing a second chill block means substantially on top of said overlapped foils so that said second chill block means is located substantially over said first chill block means; and placing a hold down grounding block means, attached to a grounding source, substantially on top of said second chill block means to keep said overlapped foils in place;
   activating said heating means; and
   activating said drive means to create a splice between said tapes.

6. The splicing method, according to claim 5, wherein said activating said heating means is further comprised of the steps of:
   flowing a TIG gas through said heating means; and
   creating a spark in said heating means so that a torch beam is created.

7. The splicing method, according to claim 5, wherein said activating said drive means is further comprised of the steps of:
   activating and adjusting a speed control means;
   activating and adjusting a direction control means; and
   traversing said holding means so that said heating means creates a weldment along said tapes.

* * * * *